(12) United States Patent
Marejka et al.

(10) Patent No.: US 8,856,635 B2
(45) Date of Patent: Oct. 7, 2014

(54) LOADER AND PROVIDER CONFIGURATION FOR REMOTELY PROVIDED SERVICES

(75) Inventors: Richard Marejka, Nobleton (CA); David Haynes, Streetsville (CA)

(73) Assignee: Oracle America, Inc., Redwood City, CA (US)

( * ) Notice: Subject to any disclaimer, the term of this patent is extended or adjusted under 35 U.S.C. 154(b) by 2651 days.

(21) Appl. No.: 11/381,917

(22) Filed: May 5, 2006

(65) Prior Publication Data
US 2006/0212793 A1  Sep. 21, 2006

Related U.S. Application Data

(62) Division of application No. 10/184,598, filed on Jun. 27, 2002, now abandoned.

(60) Provisional application No. 60/348,626, filed on Jan. 14, 2002, provisional application No. 60/377,183, filed on Apr. 30, 2002.

(51) Int. Cl.
*G06F 3/00* (2006.01)
*H04L 12/26* (2006.01)
*G06F 9/54* (2006.01)
*H04L 12/24* (2006.01)

(52) U.S. Cl.
CPC ............ *G06F 9/546* (2013.01); *H04L 41/5064* (2013.01); *H04L 41/0859* (2013.01); *H04L 43/0817* (2013.01); *H04L 41/0806* (2013.01); *H04L 41/0853* (2013.01)

USPC .......................................................... 715/200

(58) Field of Classification Search
USPC .................................. 715/234, 243, 254, 200
See application file for complete search history.

(56) References Cited

U.S. PATENT DOCUMENTS

| | | |
|---|---|---|
| 5,437,023 A | 7/1995 | Sheets et al. |
| 5,598,530 A * | 1/1997 | Nagae ............................. 714/21 |
| 5,790,777 A | 8/1998 | Izuta et al. |
| 5,949,976 A | 9/1999 | Chappelle |
| 6,205,413 B1 | 3/2001 | Bisdikian et al. |
| 6,282,175 B1 | 8/2001 | Steele et al. |
| 6,321,264 B1 | 11/2001 | Fletcher et al. |
| 6,442,565 B1 | 8/2002 | Tyra et al. |
| 2002/0016959 A1 | 2/2002 | Barton et al. |
| 2003/0159135 A1 * | 8/2003 | Hiller et al. .................... 717/166 |

* cited by examiner

*Primary Examiner* — Kyle Stork
(74) *Attorney, Agent, or Firm* — Marsh Fischmann & Breyfogle LLP; Kent A. Lembke (57) ABSTRACT

A system and method of accessing remote services through a network including generating a message within a local computer system using a process having a specified type and version. The message is associated with the specified type and version and transported to an remote service provider system. The remote service provider system parses the message to identify the type and version information, then passes the message to a particular process that corresponds to the process used to generate the message based upon the type and version information.

14 Claims, 4 Drawing Sheets

FIG. 4

LOADER AND PROVIDER CONFIGURATION FOR REMOTELY PROVIDED SERVICES

RELATED APPLICATIONS

The present application claims priority from, and is a divisional of, U.S. patent application Ser. No. 10/184,598 filed on Jun. 27, 2002 which claims the benefit of U.S. Provisional Application No. 60/348,626, filed Jan. 14, 2002, and U.S. Provisional Application No. 60/377,183 filed on Apr. 30, 2002. The disclosures of the foregoing United States patent applications are specifically incorporated herein by this reference in their entirety and assigned to Sun Microsystems, Inc., Santa Clara, Calif., assignee of the present invention.

BACKGROUND OF THE INVENTION

1. Field of the Invention

The present invention relates, in general, to systems for delivering self-service solutions to individual computer systems from a central service provider, and more particularly, to methods and systems for ensuring compatibility amongst distributed software processes implementing remotely provided services such as monitoring, trend reporting, asset tracking and change over time services.

2. Relevant Background

As computing environments become more complex there is an increasing need to provide remote services. In general, remote services refer to a class of services that are implemented externally (i.e., on a remote computer system) with respect to a computer system that is using the services (i.e., a local computer system). Remotely provided services enable tasks that are difficult, inefficient, or impossible to implement on a local computer system to be provided by the remote computer system that may have access to more data or data, software, or processing power than is available on a local computer system.

A specific area of remote services includes the effective and cost efficient monitoring and control of servers, clients and computer network components. System monitoring involves collecting, analyzing, and acting upon various metrics that affect performance of a computer system such as CPU usage, memory usage, disk storage performance and the like. Monitoring solutions are adopted to reduce customer and service downtime, to improve customer service and staff and customer productivity, to reduce computer and network costs, and to reduce operating expenditures (including reducing support and maintenance staff needs). For these and other reasons, the need for system monitoring and management tools has increased dramatically and with this increased demand has come pressure for more effective and user-friendly tools and features.

Many operating systems include or can be augmented by monitoring software that monitor various hardware and software systems on the computer system in which the operating system is installed. Modern operating systems are bundled with various software to monitor CPU usage, memory paging, disk fragmentation and the like. This "local" monitoring is of some benefit, but is often disruptive to use and unfamiliar to most system users. Moreover, these local monitoring solutions lack a global perspective that enables a wider variety of conditions and interactions to be detected. For example, local monitoring cannot easily detect when a software driver or component is outdated as such detection requires reference to external information. Similarly, local monitoring cannot benefit from trends that are more readily observable over many systems.

Hence, "remote" monitoring systems have been implemented to collect monitored data from many systems into a centralized resource, analyze the collected data in the centralized resource, and make decisions and recommendations based on a more global perspective than is possible with local monitoring systems. Remote monitoring systems use various methods to obtain, collect and analyze local system data from a number of machines. Hence, remote monitoring systems have the potential to provide the benefits of a closely monitored system while offloading the monitoring tasks to a remote system and performing those tasks with a more global perspective than is possible with local system monitoring solutions.

There are a number of problems and limitations associated with existing remote service provision systems. Certain information about a local system can only be obtained by processes executing on the local system itself, with privileged access to operating system resources. Hence, these systems require that hardware and/or software (referred to as "local agents") be resident on the local systems to collect data, implement certain behaviors, and to control communications with the remote service provider. There may be tens or hundreds of local agents in a given local system. Moreover, there may be hundreds or thousands of local systems in a given environment. These local agents will vary in type from system-to-system, and in many cases will have multiple versions as the agents are updated to include new functionality and behaviors.

It is necessary that the local agents implemented on the local systems be compatible with complementary components implemented on the remote service provider system(s). One method for ensuring such compatibility is to force all monitored systems to update their local agents whenever a change is made to the monitoring system(s). However, such forced compliance is often disruptive. Hence, it is often preferable to make the remote service provider system backward compatible with all deployed instances of the local agents. As a result, the service provider systems often become bulky as the monitoring system must support an increasingly large number of remote agent types and versions. Such a system does not scale well to support a large and diverse set of local agent types and versions. Nor does such as system scale well to include many customer systems. Accordingly, a need exists for systems and methods of implementing remotely provided services in a manner that allows new types of services to be added, and new versions of existing services to be added, with minimal impact on the remote system that is providing the services.

SUMMARY OF THE INVENTION

Briefly stated, the present invention provides a system and method of accessing remote services through a network including generating a message within a local computer system using a process having a specified type and version. The message is associated with the specified type and version and transported to a remote service provider system. The remote service provider system parses the message to identify the type and version information, then passes the message to a particular process that corresponds to the process used to generate the message based upon the type and version information.

DETAILED DESCRIPTION OF THE PREFERRED EMBODIMENTS

The present invention is directed to systems, methods and software for providing remote services in a networked computer environment. In this system, a number of customer computer systems each comprise a plurality of local or monitored computing systems, which may be of similar configuration or may vary considerably from each other. A customer computer system may comprise, for example, a plurality of workstations coupled together by a local area network (LAN), wide area network (WAN) or the like.

The monitored computing systems communicate with one or more centralized service provider systems. The communication may be either uni-directional (i.e., from the customer systems to the service provider system(s)) or may be bi-directional. The monitored computing systems implement processes, referred to specifically as "providers" herein, that convey system-specific data. The service provider system implements processes, referred to specifically as "loaders", that respond to, process, and store the data supplied from the monitored systems to provide some service that either can not be provided by the monitored system alone, or is otherwise inefficient or impractical to implement on the monitored system alone.

More specifically, the present invention implements a system for remotely providing self-monitoring and trending services to allow monitoring configuration information, events, trends, as well as software and hardware performance metrics and other information regarding the customer computer systems and networks, as well as the individual monitored computer systems within the customer computer system. The centralized service provider has knowledge that is very specific and fine grained about the monitored computer systems as it can be obtained by providers operating within the monitored systems themselves. At the same time, the service provider has very broad knowledge spanning many monitored systems distributed throughout a customer system, and preferably spanning multiple customer systems. This broad-ranging yet finely grained knowledge enables services to be provided more efficiently, and new types of services to be provided.

Figure 1:
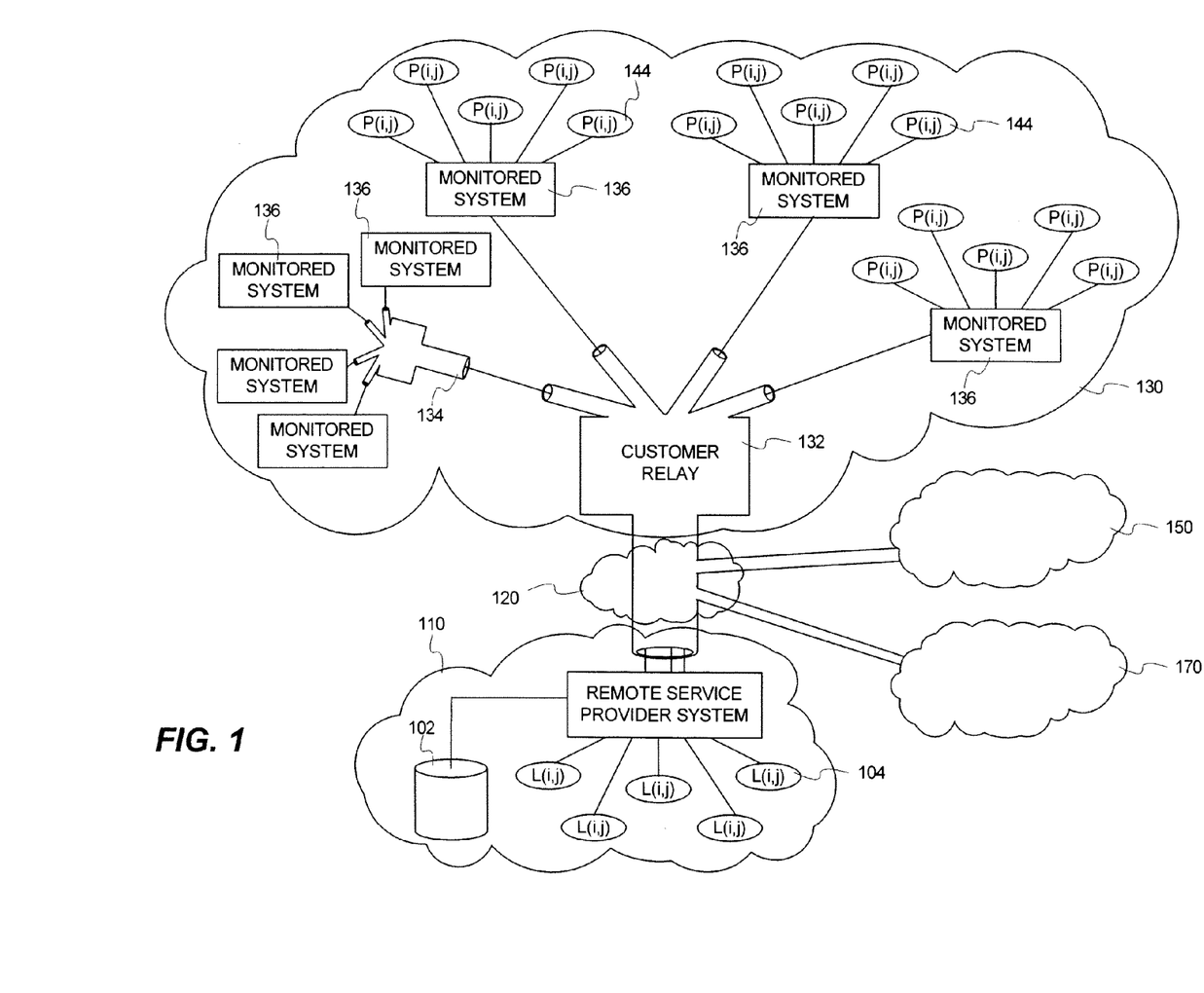
FIG. 1 illustrates a remote service delivery system in accordance with the present invention.

In a particular implementation shown in FIG. 1, a service provider "pipeline" is provided to implement a communication link between the provider and loader processes. The service provider pipeline includes private and/or public network components. The private network components include workstations, servers, routers, switches and the like within a customer system 130, 150 or 170. Each customer system may implement a firewall (not shown) to define the separation between the public network components and the private network components. The public network components include, for example, Internet 120. Private and public networks may comprise a variety of data communication technologies including internet protocol, asynchronous transfer mode (ATM), fibre channel, and the like.

In a specific implementation, the pipeline includes cascaded relays that store, and forward communications between provider processes and loader processes, although other network communication architectures may be employed to meet the needs of the invention. In the particular embodiments, the pipeline includes a "monitored system relay" implemented at each monitored system 136, that aggregates communication from a number of upstream provider processes, an optional "forwarding relay" 134 that aggregates communication from a number of upstream monitored system relays, and at least one "customer relay" 132 that aggregates communication from a number of upstream monitored system relays and forwarding relays 134. This cascaded pipeline architecture is readily scaled to support hundreds or thousands of monitored systems 136 in a plurality of customer systems 130, 150 and 170.

In particular implementations, the various relays 132, 134 and 232 are implemented as software processes operating within otherwise general-purpose computers within a customer's network. In other words, in addition to implementing the relay processes, the relays are used for other user-specific applications and/or application and file serving processes. Accordingly, it is preferred that the relay processes consume a relatively small portion of the resources available on the computers upon which they are implemented. While the monitored system relays will, by definition implement provider processes to collect data about the monitored system 136, the customer and forwarding relay systems 132 and 134 may also implement provider processes themselves and so are essentially self-monitoring.

The customer relay 132 is preferably coupled through a secure channel in a public network, such as the Internet, to the remote service provider system 110. For this reason, the customer relay 132 is alternatively referred to as an Internet relay. This preferred cascaded pipeline architecture supports reliable messaging and in preferred embodiments, transmits received messages based on a priority scheme that facilitates effective and timely communication of messages and data based on assigned priorities (e.g., priorities assigned by transmitting devices such as the monitored systems 136 and/or relays and the service provider system 110).

Remote service provider system 110 includes a datastore 102 and various loader processes 104 that function to process collected data. Each loader process is identified by a type "i" and version "j" as indicated by the nomenclature L(i,j) in FIG. 1. Each L(i,j) corresponds to a unique provider process 144 having a corresponding type "i" and version "j". Remote service provider system 110 receives messages containing collected system data, and calls a specific loader 104 based on type and version information of the provider 144 that collected the data in the message. The specified loader then processes the collected system data by, for example, storing the data in a particular manner in datastore 102, generating alerts, email messages, or other desired action.

In this manner, each loader 104 has a very specific task and can be made very compact. Loaders 104 need not be backward compatible with prior versions of providers 144 of a particular type. Similarly, new types of providers 144 can be readily implemented by implementing a corresponding loader 104.

Multiple forwarding relays 134 may be connected to a single customer relay 132 and a single forwarding relay 134 can support a large number of monitored relays 136 (i.e., a large monitored system to forwarding relay ratio). Additionally, forwarding relays 134 may be linked to provide more complex configurations and to allow even more monitored systems to be supported within a customer system 130, 150 and 170.

Figure 2:
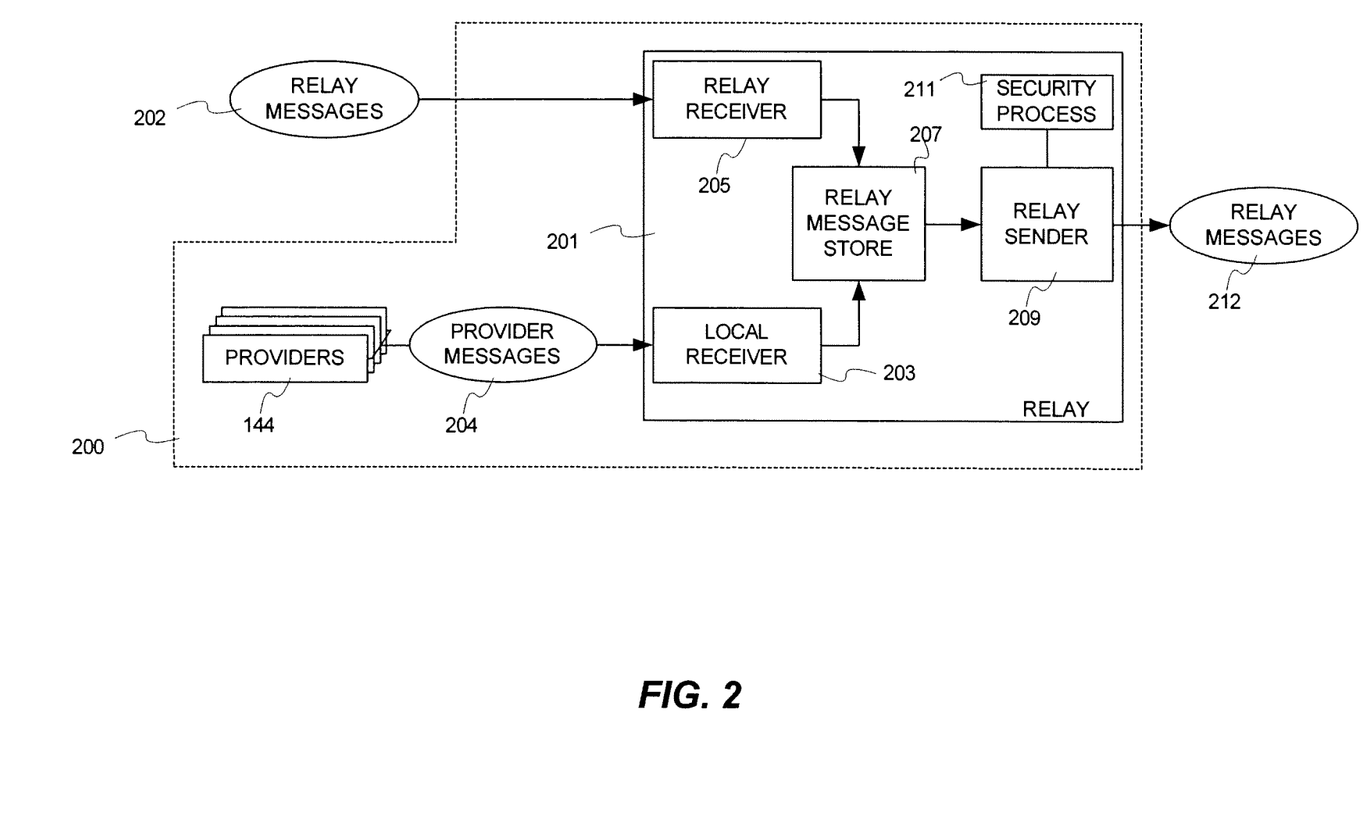
FIG. 2 illustrates a generic relay in block diagram form.

FIG. 2 shows a computer system 200 that implements a generic relay 201 illustrating various features of the monitored system relay 301, forwarding relay 134 and customer relay 132. The objects and data structures shown in FIG. 2 are intended to occupy no more than 5% and preferably 1% of the resources of a given computer system 200. Accordingly, many other processes, including operating system and application processes, may be implemented concurrently with the relay processes shown in FIG. 2 without materially affecting performance. To improve software reuse, the various relays used in the particular implementation are preferably implemented as extensions of the generic relay 201. Some of the features of the generic relay 201 shown in FIG. 2 may be omitted in particular instances.

Relay 201 receives external relay messages 202 into a relay receiver process 205 from an upstream relay, if an upstream relay is present. In the case of a monitored system relay, there are no upstream relays and so relay receiver 205 need not be implemented. Preferably all computer systems 200 that implement relays 201 include provider processes 144 (each having a type and version identifier) that collect data about computer system 200 and software within computer system 200. Providers 144 generate provider messages which are typically a few kilobytes in length and contain system data in a particular format specified by the particular provider process 144 that collected the data. Any number of providers 144 may be implemented in a particular computer system 200.

Provider processes 144 typically execute on a particular schedule, the frequency of which may vary from a few minutes to several days. In some instances providers 144 may run continuously. The relay implements an application level protocol. This application level protocol is built on a full-duplex, connection oriented, byte stream protocol such as TCP/IP in a particular example. Provider messages 204 may be encrypted or in the clear, and may be transported using a well known format such as Internet protocol (IP), or in a proprietary protocol. Provider messages are received by a local receiver process 203 associated with relay 201.

Relay receiver 205 and local receiver 203 provide the relay messages 202 and provider messages 204 to a relay message store 207. Relay message store 207 buffers or caches messages to ensure reliable communication. For example, when a message is not received intact, local receiver 203 or relay receiver 205 can take remedial action to re-obtain the message. Relay message store 207 also enables messages to be stored for an arbitrary amount of time before forwarding downstream. This storage capability allows bandwidth management and load balancing to ensure that the remote services system in accordance with the present invention does not consume excessive bandwidth.

Relay message store 207 issues stored messages to relay sender 209 for downstream transmission in the form of relay messages 212. Provider messages 204 become relay messages 212 when forwarded. Relay messages 212 are handled so that each message remains bound to the type and version identification associated with the provider 144 that collected the system data in the message. In some instances, security processes 211, such as encryption processes, interact with relay sender 209 to protect relay messages 212. In addition, messages 212 may be compressed to conserve network bandwidth where compression would be performed before encryption where encryption is used.

Relay message store 207 preferably implements some form of prioritization mechanism so that messages are issued to relay sender 209 based on a date-of-arrival ordered list of commands and messages from upstream and downstream relays. Preferably, provider messages 204 and relay messages 202 can be associated with a priority value. The prioritization processes allow a message stored in relay message store 207 to be issued out of order (i.e., ahead of older messages), or to be issued even though the bandwidth required consumes more resources than ideal.

Priorities can be assigned or adjusted based on the system of origination, the type or classification of the message, and other criteria. For example, system internal messages may be assigned the highest priority and sent immediately (e.g., never delayed or within a set time period, such as 5 minutes of posting). Alerts may be set to have the next highest priority relative to the internal messages and sent immediately or within a set time period (barring network and Internet latencies) such as 5 minutes. Nominal trend data is typically smaller in volume and given the next highest priority level. High-volume collected data such as configuration data is given lowest priority. Of course, the particular priorities assigned for messages within the system 200 may be varied to practice the prioritization features of the present invention.

Figure 3:
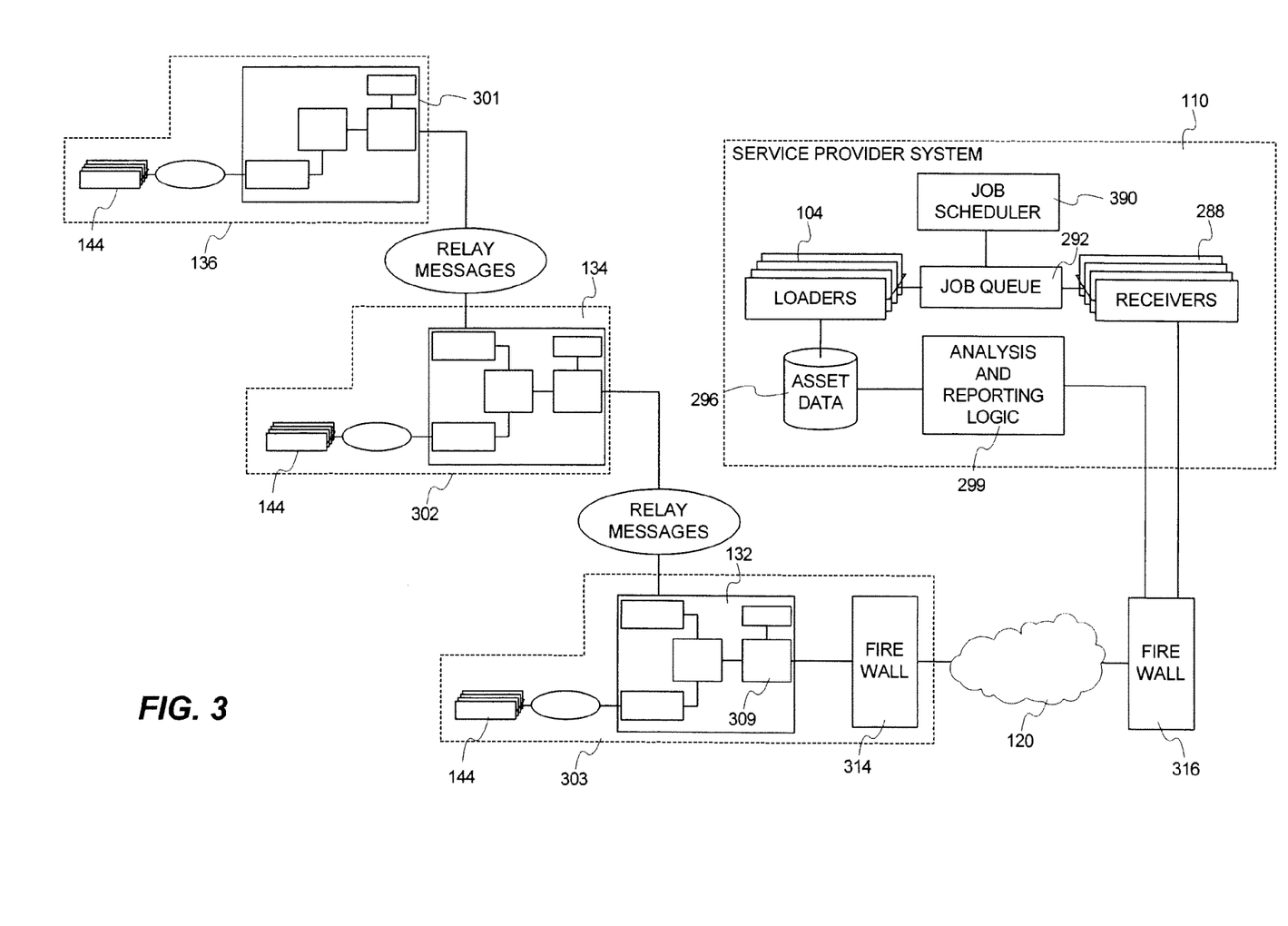
FIG. 3; shows a cascaded pipeline using instances of the generic relay shown in FIG. 2.

FIG. 3 illustrates a cascaded pipeline including multiple relay instances including a monitored system relay 301, a forwarding relay 134, and an Internet relay 132. For ease of understanding, single instance of each type of relay is illustrated, although multiple instances are contemplated in a practical system. Monitored system relay 301 is implemented in a monitored system 136 along with various data providers 144. A monitored system is the most upstream component, and so need not implement relay receiver(s) 205. Monitored system relay 301 generates relay messages 202 coupled to a relay receiver process 205 of a forwarding relay 134. Forwarding relay 134 is implemented in a computer system 302 that is independent of monitored system 136. Similarly, forwarding relay 134 generates relay messages 202 coupled to a relay receiver process 205 of another forwarding relay 134 or an Internet relay 132. Internet relay 132 is implemented in a computer system 303 that is independent of monitored system 136 and computer system 302. Internet relay 309 is coupled to Internet 120, preferably through a firewall 314.

One feature of using a generic relay 201 to implement the various specific relay instances is that providers 144 can be implemented in computer systems 302 and 303 and associated with the downstream relays 134 and 132. This enables the downstream relays 134 and 132 to be self-monitoring. This is particularly useful when it is desirable to ensure that the relays 134 and 132 do not consume excessive resources (e.g., CPU clock cycles, memory resources, memory system paging, network bandwidth and the like). Because relays 301, 134 and 132 are implemented on existing computer systems with other primary functions, managing the impact of the relay processes is important to acceptance and utility of a remote monitoring system.

The service provider system 110 is preferably linked to the Internet 120 via firewall 316 for communicating messages with the customer relay 132. The service provider system 110 includes receivers 288 which are responsible for accepting data transmissions from the customer system 303 and brokering the data to the appropriate data loaders 104 through job queue 292. Any number of receivers 288 may be implemented, constrained only by the resources of the provider system 110. A receiver instance 288 is implemented, for example, for each Internet relay 132.

Receivers 288 and sender processes 309 of the Internet relay 132 together implement a secure protocol for data communication across Internet 120. Preferably, the secure protocol is selected to be a standardized protocol such as secure sockets layer (SSL) that allows service provider system 110 to authenticate each Internet relay 132. It is contemplated that dual authentication may be implemented to allow Internet relays 132 to authenticate the service provider system 110 as well, although dual authentication is optional.

By using a security protocol that uses well-known secure ports, firewalls 314 and 316 do not require special modifications to implement a secure data communication channel. In this manner, any computer system on the customer's side that has Internet access can be designated as an Internet relay. The system in accordance with the present invention can thus be deployed by downloading, installing and executing software required to implement the Internet relay 132 largely without changes to the network configuration of a customer system.

The Internet relay 132 is subsequently registered with the service provider system in a process that involves exchange of security information, such as a shared secret key. The shared secret information can then be used to secure communication across public networks such as Internet 120. Because systems upstream of Internet relay 132 may be implicitly secure because they are behind firewall 314, it is contemplated that relay messages 202 may be sent in the clear within the private network security environment. Alternatively, the monitored system relays and forwarding relays may use any type of security procedure desired for messages communicated within the private communication network.

Significantly, neither the providers 144 nor the monitored system relays 301, nor the forwarding relays 134 need be explicitly registered or authenticated with the service provider system. In typical customer systems, the individual monitored systems 136 are already authenticated before allowing connection to a LAN, hence, security within the private network has already been implemented. In this manner, the system in accordance with the present invention ensures that secure communications from a provider 144 to a loader 104 are provided. This flexibility is a significant advantage in system deployment as hundreds of monitored systems may leverage the security relationship established by a single Internet relay 132.

Received messages or jobs are queued in job queue 292 and the job queue 292 holds the complete record of the data gathered by a provider 144 until it is processed by a corresponding data loader 104. Each message retains its association with a provider type and version such that the service provider system 110 can call the loader 104 having corresponding type and version. Priority values associated with each message are also retained and used by service provider system 110 for selecting jobs from job queue 292 in order of priority. The data loaders 104 function to accept data from job queue 292 and process the data into a format which is stored in asset data store 296 or to rebroadcast via electronic mail, secure copy or un-secure copy within a secure network.

Analysis and reporting logic 299 functions to process data from asset data store 296 periodically or upon request. Analysis and reporting logic is accessible directly on service provider system 110, or remotely through a permissioned access system accessible by Internet 120. The types of reports may vary but typically include time-based monitoring data for trend analysis, system configuration data for system discovery and planning, and time-based monitoring data evaluated against a set of performance level metrics (e.g., alerts) and may be in HTML or other format.

Figure 4:
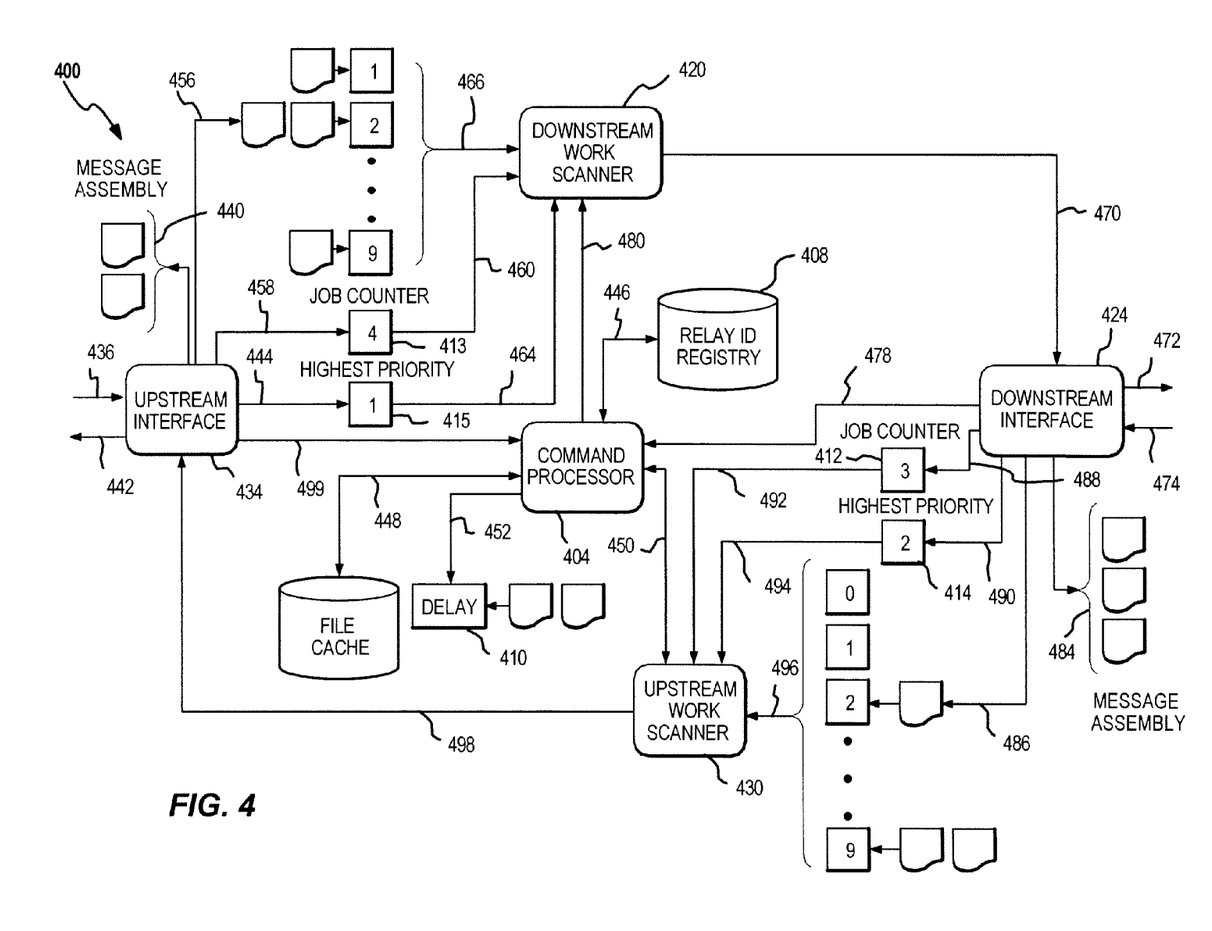
FIG. 4 is a block diagram illustration of a forwarding relay in accordance with the present invention.

Referring now to FIG. 4, a block diagram of the internal structure 400 of a forwarding relay, such as relay 201 of FIG. 2, is illustrated to more fully describe how the relays of the invention support the fan-out and priority-based messaging functions of the invention. Each relay is connected to other relays by associating a downstream interface of one relay with the upstream relay of another, with the upstream terminus of the pipeline being the data provider manager or agent and the downstream terminus of the pipeline being the receiving agents or receivers. Relays pass messages to each other, and the messages may be of a particular type, such as "command" and "data." Command messages are used to initiate certain actions on a target relay and data messages contain segments of information that are eventually assembled into files.

As shown, the internal relay structure 400 includes an upstream interface 434 that coordinates all data transmissions to and from the relay 400 in the upstream direction (i.e., toward the monitored system). A message arriving 436 at the upstream interface 434 may be a command or data message with some commands destined for the command processor 404 and some commands being relevant for the upstream interface 434, e.g., "start of file" and "end of file" commands. To support file transmission, upon receipt of a "start of file" command the upstream interface 434 opens a file in its message assembly area 440. The start of file command has associated with it the priority of the file being transmitted. As data segments arrive of the same priority, they are appended to the file in the file assembly area 440. When the end of message command is received, the upstream interface 434 closes the file and places it 456 on the appropriate work queue for the downstream work scanner 420 and increases the job counter 413 indicating the number of downstream jobs pending. The priority of the file being added to the downstream queues is compared against the highest priority register 415 and if the new file is of higher priority, that new priority is written to the highest priority register 415. The upstream interface 434 also receives registration command messages which are passed to the command processor 404 and upstream acknowledgement command messages which are passed to the command processor 404 for subsequent processing. The upstream interface 434 further controls the transmission throttle for upstream communications. In order not to consume all the available network bandwidth, transmitted data may be restricted to a predefined number of bytes per unit time, with the value of this restriction being a configurable and adjustable value.

The downstream work scanner 420 is provided to determine which messages are transmitted to the downstream interface 424. While the queues associated with the downstream work scanner 420 store files, the downstream work scanner 420 works with messages (a message is composed of one message). The scanner 420 begins functioning by examining the job counter 413. When the job counter 413 is not zero there is work, and the scanner 420 reads the value of the highest priority register 415. The scanner 420 then obtains the next message from the highest priority of work queue. The scanner 420 then sends the message to the downstream interface 424, such as by a block transmission (e.g., the scanner 420 waits for the message to be received prior to scanning for new work). The use of block transmissions is desirable for supporting throttling of the downstream interface 424. The scanner 420 also implements an acknowledgement handshake protocol with the upstream interface of the downstream relay (not shown). When the downstream relay sends an acknowledgement command 474, the command is sent to the command processor 404 which routes it to the downstream work scanner 420. Upon receipt of the acknowledgement command, the scanner 420 releases the file from the work queues, decrements the job counter 413, and rescans the queues for the highest priority value.

The downstream interface 424 coordinates all transmissions to or from linked downstream relays (not shown). To allow the relay 400 to provide message transmission, the downstream interface 424, upon receipt of a message, transmits the message to the associated downstream relay. Throttling is provided by the downstream interface 424 by enforcing a limit on the amount of data that can be transmitted per unit of time. As with the upstream interface 434, the throttling value is a configurable and adjustable value or parameter. If the throttling value is exceeded, the downstream interface 424 does not read new data from the downstream work scanner 420. Once sufficient time has passed to allow new transmissions, the downstream interface 424 accepts the message from the work scanner 420 and proceeds to transmit it downstream. During message reception, the interface 424 accepts messages 474 from the downstream relay (not shown) destined for the relay 400 or for upstream relays (not shown). The messages are routed in the same manner as the upstream interface 434 routes received messages but for two exceptions. First, upstream messages contain a recipient list of relay identifiers. These recipient lists have been implemented to reduce the duplication of data being transmitted to the intermediate or forwarding relays. Second, some upstream messages are actually command messages destined for upstream systems and have a priority of zero (highest priority) and a recipient list that includes upstream relay identifiers.

The upstream work scanner 430 is included to determine which messages are transmitted to the upstream interface 434 for transmittal to upstream relays (not shown). During message transmission, the scanner 430 examines the job counter 412 and when not zero, the scanner 430 reads the value of the highest priority register 414. The scanner 430 then obtains the next message from the highest priority work queue 496. The scanner 430 then sends the retrieved message to the upstream interface 434, such as by blocked transmission (e.g., by waiting for receipt of message prior to scanning for new work) to support throttling at the upstream interface 434. The scanner 430 implements an acknowledgement handshake protocol with the downstream interface of the immediate upstream relay 436 (not shown) and when an acknowledgement command is received from the upstream relay it is first sent to the command processor 404 and then routed to the scanner 430. Upon receipt of the acknowledgement, the scanner 430 releases the file from the work queues 496, decrements the job counter 412, and rescans the queues for the highest priority value. In some cases, it may not be possible to send a message to one or more of the upstream relays identified by the recipient list of the message. In this case, the scanner 430 passes the message to the command processor 404 for insertion in the delay queue 410. At some future time, the command processor 404 re-inserts a delayed transmission based on the registration of a recipient relay and the scanner 430 then accepts the message from the command processor 404 and re-queues it on the appropriate priority queue.

The command processor 404 acts as the overall coordinator of operations within the relay 400 and acts as the file cache manager, the delayed transmission queue manager, and the relay registry agent. The command processor 404 handles the processing of most command messages (with the exception of start of file and end of file command messages) within the relay 400. The most commonly processed command is the file acknowledgement command that indicates that the upstream or downstream recipient relay has received a complete file. When this command is received, the command processor 404 notifies the corresponding work scanner 420 or 430 to release the file from the work queues.

The command processor 404 acts as a file cache manager and in one embodiment, acts to only cache the current version of any software or configuration files in relays 400 with no children, as the file caches of parent relays hold all the files contained in child relays due to the hierarchical nature of the pipeline. Parents of such childless relays 400 will cache the current and previous versions of any software or configuration files. Since there exists within systems according to the invention the possibility that not all designated recipients of a message will be able to receive it, the command processor 404 is configured to manage delayed transmissions without adversely affecting other message traffic. If an upstream work scanner 430 is unable to deliver a message to a recipient, the file associated with that message is passed to the command processor 404 for inclusion on its delayed transmission queue 410. The command processor 404 further acts as a relay registry agent by making a record of the relay identifier of the registrant for storage in registry 408 when an upstream relay becomes active and sends a registration message to its downstream relay. The registration command message also includes a list of all configuration and software versions associated with the upstream relay. This list is compared by the command processor 404 to the list of required versions maintained in the file cache 448. Any upgrades in software or configuration files are sent by the command processor 404 to the upstream work scanner 430 for insertion onto the appropriate queues. The delayed transmission queue 410 is then scanned to determine if there are any messages on the queue that are destined for the new registrant. If so, these messages are passed to the upstream work scanner 430 for insertion onto the appropriate queues.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed.

We claim:

1. A method of generating provider data comprising the steps of:

first collecting system data from a customer system with a first data provider process executing on a computer system within the customer system;

first associating the system data from the customer system with first version data of the first data provider process to form first provider data associated with the computer system, wherein the first version data of the first data provider process includes a type of the first data provider process and a version of the first data provider process;

second collecting system data from the customer system with a second data provider process executing on a computer within the customer system;

second associating the system data from the customer system with second version data of the second data provider process to form second provider data associated with the computer system, wherein the second version data of the second data provider process includes a type of the second data provider process and a version of the second data provider process and wherein either or both the type and the version of the second data provider process differs from the type and version of the first data provider process; and transporting the first and second provider data to a service provider system, wherein the service provider system includes plurality of data loaders corresponding to version data of a plurality of data provider processes, receivers for accepting system data collected from the customer system and brokering the system data from the first and second data provider processes to first and second ones of the data loaders selected to load the system data based on the type and the version of data provider process assigned during the first and second associating, and a job queue for retaining provider data until it is processed by the first or second data loader and wherein the data loaders and receivers are provided by code executed by a processor of the service provider system.

2. The method of claim 1, wherein the first and second data loaders in the service provider system are designed to process the first and second provider data, respectively, generated by a pre-selected type and version of a data provider program associated with each of the first and second data provider processes.

3. The method of claim 1, wherein transporting the first and second provider data comprises the step of:
sending the first and second provider data through a cascaded pipeline comprising a monitored relay, a forwarding relay in electronic communication with the monitored relay, and an Internet relay in electronic communication with both the forwarding relay and the service provider system.

4. The method of claim 1, wherein the first and second provider data comprises time data that indicates the time that the system data was collected from the customer system.

5. The method of claim 1, wherein the first and second provider data is selected from the group consisting of configuration data, event data, trending data, reboot data, and field replaceable unit identification data.

6. A non-transitory computer readable medium and computer readable code embodied on the non-transitory computer readable medium for generating provider data from a customer computer system to a remote services system, the computer program product comprising:
first computer readable program code devices executable on a customer computer system to cause the customer computer system to effect collecting system data from the customer system;
second computer readable program code devices executable on the customer computer system to cause the customer computer system to effect binding the collected system data with provider metadata to form a plurality of provider messages, wherein the provider metadata identifies a type and a version of the first computer code devices, wherein the first computer code devices include a plurality of differing types of data providers and a plurality of differing versions of data providers; and
third computer readable program code devices executable on the remote services system to cause the remote services system to effect receiving the plurality of provider messages and to call a specific loader based on the type and the version of the first computer code device bound to the collected, wherein each of the called specific loaders process the system data in the provider message to generate monitoring data for the customer computer system.

7. The non-transitory computer readable medium of claim 6 wherein the first computer code devices are configured to gather configuration data describing a current configuration of the customer computer system.

8. The non-transitory computer readable medium of claim 6 wherein the first computer code devices are configured to gather delta configuration data describing a changes in configuration of the customer computer system with respect to a previous time.

9. The non-transitory computer readable medium of claim 6 wherein the first computer code devices are configured to gather event data describing an describing system status information and compare the system status information against predetermined thresholds.

10. The non-transitory computer readable medium of claim 6 wherein the first computer code devices are configured to gather trend data indicating system performance metrics, wherein the first computer code devices are executed at predetermined times according to a programmed schedule.

11. The non-transitory computer readable medium of claim 6 wherein the first computer code devices are configured to gather performance metrics data comprising a value indicating at least one of processor utilization, memory utilization, swap space utilization, root disk utilization, and uptime.

12. A system for implementing remote services on a plurality of customer computer systems, the system comprising:
a microprocessor;
a remote services communication pipeline that is accessible by a remote services computer and by each of the customer computer systems;
a first type of provider process executed by the processors on the plurality of the customer computer systems, the first type of provider process having multiple versions; and
a first type of load process executed by processors on the remote service computer, wherein the first type of loader process has a version corresponding to each version of the first type of provider process.

13. The system of claim 12 further comprising:
a first instance of the first type of provider executing on one of the plurality of customer computer systems;
a second instance of the first type of provider executing on one of the plurality of customer computer systems, wherein the first and second instances have different versions.

14. A method of accessing remote services through a network comprising:
generating a message within a local computer system using a process, implemented by a processor of the local computer system, having a specified type and version;
with the process on the local computer system, associating the message with the specified type and version; and
transporting the message to an external service provider system, wherein the external service provider system includes a data loader corresponding to the specific type and version of the process, receivers for accepting the message from the local customer system, and a job queue for retaining the message until it is processed by the data loader and priority values used by the service provider system for job selection and wherein the data loader and receivers are provided by code executed by a processor of the external service provider system.

* * * * *

UNITED STATES PATENT AND TRADEMARK OFFICE
CERTIFICATE OF CORRECTION

| | | |
|---|---|---|
| PATENT NO. | : 8,856,635 B2 | Page 1 of 1 |
| APPLICATION NO. | : 11/381917 | |
| DATED | : October 7, 2014 | |
| INVENTOR(S) | : Marejka et al. | |

It is certified that error appears in the above-identified patent and that said Letters Patent is hereby corrected as shown below:

In The Claims

In column 12, line 18, in Claim 11, delete "of" and insert -- of: --, therefor.

Signed and Sealed this
Fifth Day of May, 2015

Michelle K. Lee
*Director of the United States Patent and Trademark Office*